J. M. NEIL.
PROCESS OF TREATING FLUIDS SUCH AS WATER AND SEWAGE.
APPLICATION FILED MAR. 1, 1912.
1,045,096.
Patented Nov. 19, 1912.
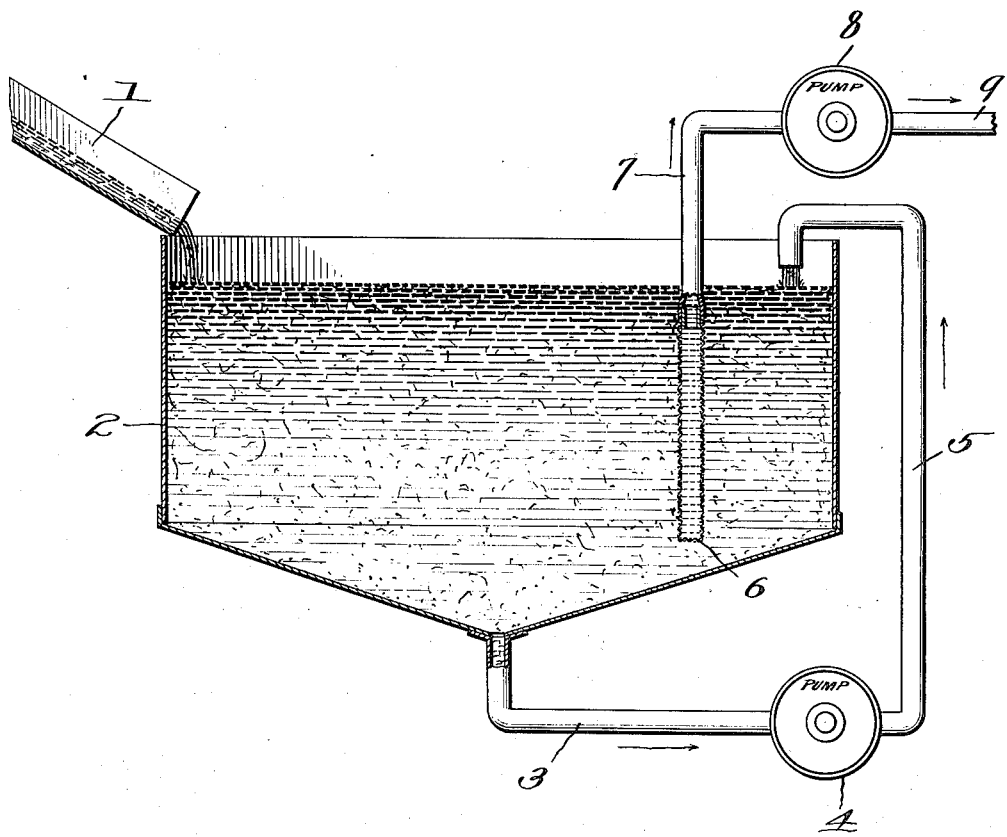
WITNESSES
INVENTOR
James Millar Neil
By:
Alexander F. Sowell
Attorneys

UNITED STATES PATENT OFFICE.

JAMES MILLAR NEIL, OF NEW YORK, N. Y.

PROCESS OF TREATING FLUIDS, SUCH AS WATER AND SEWAGE.

1,045,096.        Specification of Letters Patent.     Patented Nov. 19, 1912.

Application filed March 1, 1912. Serial No. 681,009.

*To all whom it may concern:*

Be it known that I, JAMES MILLAR NEIL, of New York, in the county of New York and State of New York, have invented certain new and useful Improvements in Processes of Treating Fluids, Such as Water and Sewage; and I hereby declare that the following is a full, clear, and exact description thereof.

This invention is an improved process for the treatment and purification of fluids, especially water and sewage, and has for one of its objects the production of a clear liquid, suitable for domestic and industrial purposes, free from foreign and organic matter, and from harmful bacteria.

In the treatment of fluids, and more especially sewage, a precipitant (such as a compound of calcium oxid, and calcium carbonate, or a mixture of such calcium compounds,) has been used to effect the precipitation of organic matter and foreign substances, etc., in the fluid; and hypochlorite of calcium has been also used in connection therewith as a germicide. The precipitated matters resulting from the above treatment are of such a nature as to render their separation from the liquid or water a difficult or tedious and slow operation, and it has heretofore been customary to effect this separation by means of settling tanks, and sand or similar filtration beds,—as owing to the character of such precipitates their separation by mechanical filters has been proven impractical. Owing principally to imperfect precipitation of the organic matter, and the small percentage of bacteria left; but more especially to the length of time in which the precipitates are left in contact with the liquid undergoing treatment; secondary reactions occur which prevent the maximum purification being accomplished, and the bacteria is only held in check by use of an excess of germicide.

A purification process for fluids, such as water or sewage, should effect the thorough precipitation of all the organic and foreign matter therein, the complete destruction of harmful bacteria; and produce a clear liquid, free from odor, etc. In order to produce the above desired results, an important and essential factor is that the separation of the liquid from the solid matter should be rapidly effected in order to prevent the occurrence of any secondary reactions. Another feature of the purification of fluids is that the process or system used should be such as can be carried on continuously.

I have discovered that by using an amount of precipitant (such as lime or calcium oxid,) greatly in excess of what has heretofore been deemed and used as sufficient or necessary to effect the precipitation, the physical nature of the precipitates is changed; in other words by using an excess amount of calcium oxid the organic and foreign matter in the fluid undergoing treatment will be rendered more or less friable, porous or granular; and the clear liquid can then be effectually and economically separated from such precipitates by a mechanical filter; and because of the change in the nature or composition of the solids produced by the use of the excess precipitant, a vastly greater quantity of clear liquid can be withdrawn through such filter before its surface becomes coated, than would be possible if only the ordinary small amount of precipitant had been employed. I have furthermore found that by employing a suction filter the clear liquid can be withdrawn rapidly from such a mixture; and that when a coating forms upon the surface of such filter, (as it ultimately will do), by temporarily stopping the suction and forcing water or air back through the filter such coating can be thrown off the filter back into the mixture; then the suction operation can be at once resumed to withdraw more clear liquid from the mixture, so that instead of having to remove the filter each time it becomes coated it can be quickly cleared by a reversed current therethrough, as described; and in this way by my process I am enabled to treat liquid substantially continuously and to practically effect the rapid and almost continuous separation of the clear liquid from the solids in the fluid undergoing treatment. The successful operation of my process depending upon the employment of an excess precipitant; and the intermittent throwing off of the coating on the filter as above described.

By this invention fluids, such as water and sewage, can be purified and rendered clear and odorless, free from harmful bacteria, and foreign and organic matter; and this result can be obtained in an efficient rapid and economical manner, and my process can be performed continuously if so desired.

In the practical utilization of my invention, I preferably introduce the fluid, such as water or sewage, to be treated into a tank or other receptacle; first passing the fluid preferably through screens to remove floatage and large foreign bodies therefrom; then I mix with the fluid in the tank or receptacle a quantity of a precipitant, (such as lime, calcium hydrate, or carbonate, caustic soda, and the like,) exceeding one hundred grains per gallon of fluid in the tank and agitate the mixture.

Instead of using merely such an amount of the precipitant as has heretofore and now been considered necessary to cause precipitation of the foreign and organic matter in the fluid, I use a large amount of such precipitant, in excess of that required to insure separation of the precipitated and organic matter in the fluid, from the liquid and over one hundred grains per gallon of fluid in the tank; and by using such excess of precipitant its effect upon the fluid is practically instantaneous while the mixture is in agitation.

In treating fluids, such as water or sewage, by my process the use, for example, of an excess supply of calcium carbonate in conjunction with calcium hydrate and any other desired chemical, (such as alumina in various forms, etc., and hypochlorite of lime, or soda,) to destroy bacteria; produces a rapid, efficient and complete precipitation of the solids and foreign matters from the fluid, and enables the clear liquid to be at once separated from the mixture by mechanical filtration.

I prefer to place in the tank or receptacle at the commencement of the operation such a quantity of the precipitant that when the tank or receptacle is full there will be present in the mixture therein about three parts fluid to one part of the precipitant, such as lime, calcium carbonate, etc. I have found that these proportions give excellent results, but I do not limit myself thereto.

As the clear liquid is withdrawn from the tank or receptacle through the filter, additional fluid may be admitted into the tank or receptacle and additional precipitant may be added as it becomes depleted so as to maintain a large excess supply thereof.

The contents of the tank or receptacle should be kept in a state of agitation by any suitable means; for instance by blowing air or steam therethrough, or by mechanical stirrers, etc.

At a point preferably remote from the inlet to the tank or receptacle but within the tank, I place a mechanical filter which may be of any suitable construction; but I preferably use a hollow filter having walls of any suitable material permeable to clear liquid but not permeable to solids, and the interior of such filter is connected with a suitable pumping or suction apparatus by means of which the clear liquid can be rapidly withdrawn from the tank or receptacle through the filter.

The withdrawal of the clear liquid from the agitated mixture in the tank through the suction filter tends to draw toward and against the filter surfaces any matter in suspension in the mixture in the tank or receptacle, which matter ultimately forms a coating upon the surfaces of the filter. In this connection the use of such excess of precipitant is of importance in enabling the filtering operation to be performed efficiently and practically continuously; for I have found that the successful operation of mechanical filters on fluids, such as water and sewage, requires that the permeability of their surfaces should be kept practically uniform, and that the deposits of solids upon the filter surfaces should also be kept practically uniform in thickness; in other words that the resistance to the suction should be practically uniform throughout the filter surfaces. For example, when using suction filters for fluids, such as water or sewage, large particles of matter drawn against the filter surface ordinarily affect the uniformity of the suction and cause imperfect operation of the filter, by preventing the formation of a uniformly resistant or permeable cake or coat on the surfaces thereof; but as a result of the presence of an excess of calcium in the mixture in the tank or receptacle, in my process; should any such large mass be drawn against the surface of the filter, such mass would be quickly coated with a calcium deposit until the uniformity of suction is substantially restored. Thus the use of such excess of precipitant insures that the coating on the filter will be always substantially uniform in permeability throughout the entire surface of the filter.

In the accompanying drawing I have illustrated, diagrammatically, an apparatus for carrying my process into effect.

In said drawing, 2 represents an open tank into which the fluid to be treated is preferably continuously admitted through a pipe or conduit 1. An excess quantity of precipitant is maintained in the tank, as stated; and the mixture may be agitated in the tank, for example, by means of a pipe 3 connected with the bottom of the tank and to a pump 4 by which the mixture can be withdrawn from the bottom of the tank and discharged from the pump 4 into the upper portion of the tank through a pipe 5.

6 designates a hollow suction filter, having permeable walls, which may be connected by means of a pipe 7 to a suction pump 8, by which the clear liquid can be withdrawn from the tank and discharged through a pipe 9 at any suitable point. The pump 8 is preferably of such construction that it can be reversed so as to momentarily force clear liquid back through the pipe 7 and filter 6 into the tank, thereby quickly clearing the surface of the filter; and then the suction operation can be immediately resumed as described.

In water sometimes, and in sewage always, there is present more or less oil, grease, etc., which when brought into contact with the surface of the filtering medium tends to form a film thereon and retard the process of filtration; but in my process, owing to the excess of alkali present, such oils and greases will be saponified; or if they are in an unsaponifiable condition, so comminuted, divided and commingled with the precipitant and fine particles of solids in the mixture that they will not prevent the operation of the filter. The addition of such excess of a substance, such as finely subdivided calcium carbonate, finely divided, or flocculent silica, or similar substances,—to the fluid undergoing treatment also insures the production or formation of a substantially uniform coating or layer of material on the surface of the suction filter; as such material acts as a binder or collector of the suspended matter in the fluid, and changes them in such manner as will allow of the rapid separation of the liquid constituents of the mixture therefrom.

The withdrawal of the clear liquid from the agitated mixture in the tank may be continued until the solids form a coating on the outer surfaces of the filter of such thickness as to lower the efficiency of the filter below the desired point (which will be indicated by the vacuum gage); then the suction should be temporarily stopped and liquid or air forced back through the filter, thereby throwing off the solids adhering to the outer surfaces of the filter, which drop back into the mixture in the tank or receptacle. The suction operation may then be resumed and clear liquid withdrawn from the mixture until the filter is again coated; then it may be again cleared by temporarily forcing liquid or air back through the filter as above stated. By thus intermitting the suction operations by throwing off the coating on the filter, I am able to continue the withdrawal of clear liquid from the tank or receptacle indefinitely, and practically continuously; as the time required to reverse the current and throw off the coating on the filter surfaces is very short. I preferably continue such filtering operation until such a mass of solids has accumulated in the tank, or receptacle, as to render it desirable to remove same therefrom, which may be done in any desired way.

The intermittent throwing off of the solids adhering to the filter is important in the practical economical utilization of my process, as by this means the filter leaves can always be maintained at their highest efficiency.

My process allows of the continuous treatment of water or sewage, as the clear liquid is withdrawn immediately from the agitated mixture as soon as the solids have been precipitated in the liquid. Another important advantage of using such excess of precipitant is that the fluids, such as water or sewage, can be treated by my process in open tanks, for the obnoxious odors are at once killed, and a harmless and clear effluent is produced, and owing to the immediate and complete separation of the liquid from the organic and other foreign matter in the mixture no secondary reactions occur in the separated liquid.

The solids may be conveniently removed from the tank or receptacle by withdrawing clear liquid through the filter until its surfaces are thickly coated with the solids. The coated filter may then be withdrawn from the tank or receptacle to a suitable point, continuing the suction if necessary to prevent the cake or coating dropping from the surfaces; then the suction may be stopped and the coating discharged from the filter surfaces into a suitable receiver by sluicing, washing or scraping the coating off or discharging it by means of a reversed current such as of air or water. Such operation can be repeated until as much of the solids in the tank have been removed as is desired; then the filtering operation can be resumed.

It is not desirable to remove the filter from the tank every time it becomes coated, although this might be done, as such removal requires comparatively considerable time; which time can be saved and utilized in my process for the filtering operation by simply reversing the current through the filter to throw the coating thereon back into the tank or receptacle as above described.

If desired a series of tanks or receptacles may be employed, and when the mixture in one tank or receptacle has become so thick that it is desired to remove the solids, the supply of fluid to such tank or receptacle might be stopped until the solids are removed therefrom; while the filtering operation is continued in the other tanks or receptacles.

I have also discovered that the efficiency of the hypochlorite used as a germicide is greatly increased in my process wherein an excess of calcium is used, and that superior results are obtained in my process by the use of a less quantity of germicide.

Another feature of my process is that through the continuous agitation and drawing on and throwing off of the solid matter on the filter in the tank or receptacle such matter becomes thoroughly commingled and comminuted, and the precipitated and other foreign matter originally in the water or sewage when utimately separated from the tank will be found to be finely divided and intimately mixed together with the calcium and that the solids obtained as a coating or cake will contain the nitrogen, potash, etc., along with the calcium, in such condition as renders the same of great value as a fertilizer. The separated solids could also be treated with acid to liberate any oils or greases which may have been saponified by the alkali used; and such oils, greases, etc., recovered by any of the well known methods, and the residue used as a fertilizer. The solids however may also be incinerated to destroy the organic matter therein and regenerate the calcium compounds, which may then be reused in the tank if so desired.

What I claim is:

1. The herein described process of treating fluids, such as water and sewage, consisting in introducing fluids into a tank and maintaining in the tank a quantity of precipitant exceeding 100 grains to a gallon of fluid; agitating the fluid with such precipitant to effect precipitation of the foreign and organic matters contained in the fluid, and simultaneously withdrawing from the mixture while in agitation the clear liquid through a suitable filter.

2. The herein described process of treating fluids such as water and sewage, consisting in mixing the fluid in a tank with a quantity of a precipitant in excess of the amount necessary to obtain precipitation of the foreign and organic matters contained in the fluid, the quantity of precipitant in the mixture exceeding 100 grains to a gallon of fluid; agitating such mixture in the tank; and continually withdrawing from such agitated mixture the clear liquid through a suitable filter in the tank.

3. The herein described process of treating fluids, such as water or sewage; consisting in introducing the fluid into a tank; mixing therewith an excess quantity of a suitable precipitant; the quantity of precipitant in the tank exceeding 100 grains per gallon of the fluid in the tank; agitating the mixture in the tank; and simultaneously withdrawing clear fluid from the mixture by suction through a suitable filter located in the tank, while the mixture is in agitation, until such filter is coated; then quickly clearing the filter and continuing the operation.

In testimony that I claim the foregoing as my own, I affix my signature in presence of two witnesses.

JAMES MILLAR NEIL.

Witnesses:
JAMES R. MANSFIELD,
L. E. WITHAM.